(12) United States Patent
Cantrell

(10) Patent No.: US 7,640,694 B1
(45) Date of Patent: Jan. 5, 2010

(54) HEADSTONE FLOWER MOUNTING SYSTEM

(76) Inventor: Gregory R. Cantrell, 505 Bull Mountain Blvd., Hodges, AL (US) 35571

(*) Notice: Subject to any disclaimer, the term of this patent is extended or adjusted under 35 U.S.C. 154(b) by 0 days.

(21) Appl. No.: 11/926,790

(22) Filed: Oct. 29, 2007

Related U.S. Application Data

(63) Continuation-in-part of application No. 10/989,807, filed on Nov. 17, 2004, now Pat. No. 7,305,794.

(51) Int. Cl.
*A47G 7/00* (2006.01)
(52) U.S. Cl. .............. 47/41.12; 47/41.01; 27/1
(58) Field of Classification Search ....... 47/41.1–41.15, 47/65.5, 41.01, 66.6, 68; D11/143, 144, D11/155, 156, 164; 248/499, 500, 506, 507, 248/510, 683; 27/1; 410/101
See application file for complete search history.

(56) References Cited

U.S. PATENT DOCUMENTS

| | | | |
|---|---|---|---|
| 2,372,967 A * | 4/1945 | Martin | 410/97 |
| 3,142,934 A | 8/1964 | Mehling | |
| 3,310,911 A | 3/1967 | Boser et al. | |
| 3,888,190 A * | 6/1975 | Bigge | 410/101 |
| 4,217,729 A | 8/1980 | Cooper | |
| 4,640,045 A * | 2/1987 | Nesbitt et al. | 47/67 |
| D305,876 S | 2/1990 | Gewinner | |
| D332,762 S | 1/1993 | McCafferty, Jr. | |
| 5,243,795 A * | 9/1993 | Roberts | 52/158 |
| 5,519,966 A | 5/1996 | Cassette | |
| 5,673,464 A * | 10/1997 | Whittaker | 24/301 |
| 5,704,582 A * | 1/1998 | Golembiewski et al. | 248/500 |
| 6,564,506 B1 * | 5/2003 | Leger | 47/41.01 |
| 6,688,040 B1 * | 2/2004 | Yang | 47/41.1 |
| 7,305,794 B1 * | 12/2007 | Cantrell | 47/41.12 |
| 2004/0148877 A1 * | 8/2004 | Roberts | 52/155 |

* cited by examiner

*Primary Examiner*—Rob Swiatek
*Assistant Examiner*—Kristen C Hayes

(57) ABSTRACT

A headstone flower mounting system includes a headstone that has an upper edge, a front side and a back side. A block has a top side, a bottom side, a first end, a second end, a first lateral side, a second lateral side. The bottom side of the block abuts the upper edge of the headstone. The block is comprised of a material capable of receiving flower stems. A plurality of hook members is extended into the block. A pair of eyebolts extends into the upper edge of the headstone. Each of a plurality of bands is attached to and extends between one of the eyebolts and one of the hook members. A plurality of flowers is extended into the top side of the block.

5 Claims, 4 Drawing Sheets

HEADSTONE FLOWER MOUNTING SYSTEM

CONTINUATION IN PART

This applicant is a first continuation in part of U.S. patent application Ser. No. 10/989,807 filed on Nov. 17, 2004 now U.S. Pat. No. 7,305,794.

BACKGROUND OF THE INVENTION

Field of the Invention

The present invention relates to flower mounting devices and more particularly pertains to a new flower mounting device for mounting real or artificial flowers to a headstone.

SUMMARY OF THE INVENTION

The present invention meets the needs presented above by generally comprising a headstone that has an upper edge, a front side and a back side. A block has a top side, a bottom side, a first end, a second end, a first lateral side, a second lateral side. The bottom side of the block abuts the upper edge of the headstone. The block is comprised of a material capable of receiving flower stems. A plurality of hook members is extended into the block. A pair of eyebolts extends into the upper edge of the headstone. Each of a plurality of bands is attached to and extends between one of the eyebolts and one of the hook members. A plurality of flowers is extended into the top side of the block.

There has thus been outlined, rather broadly; the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
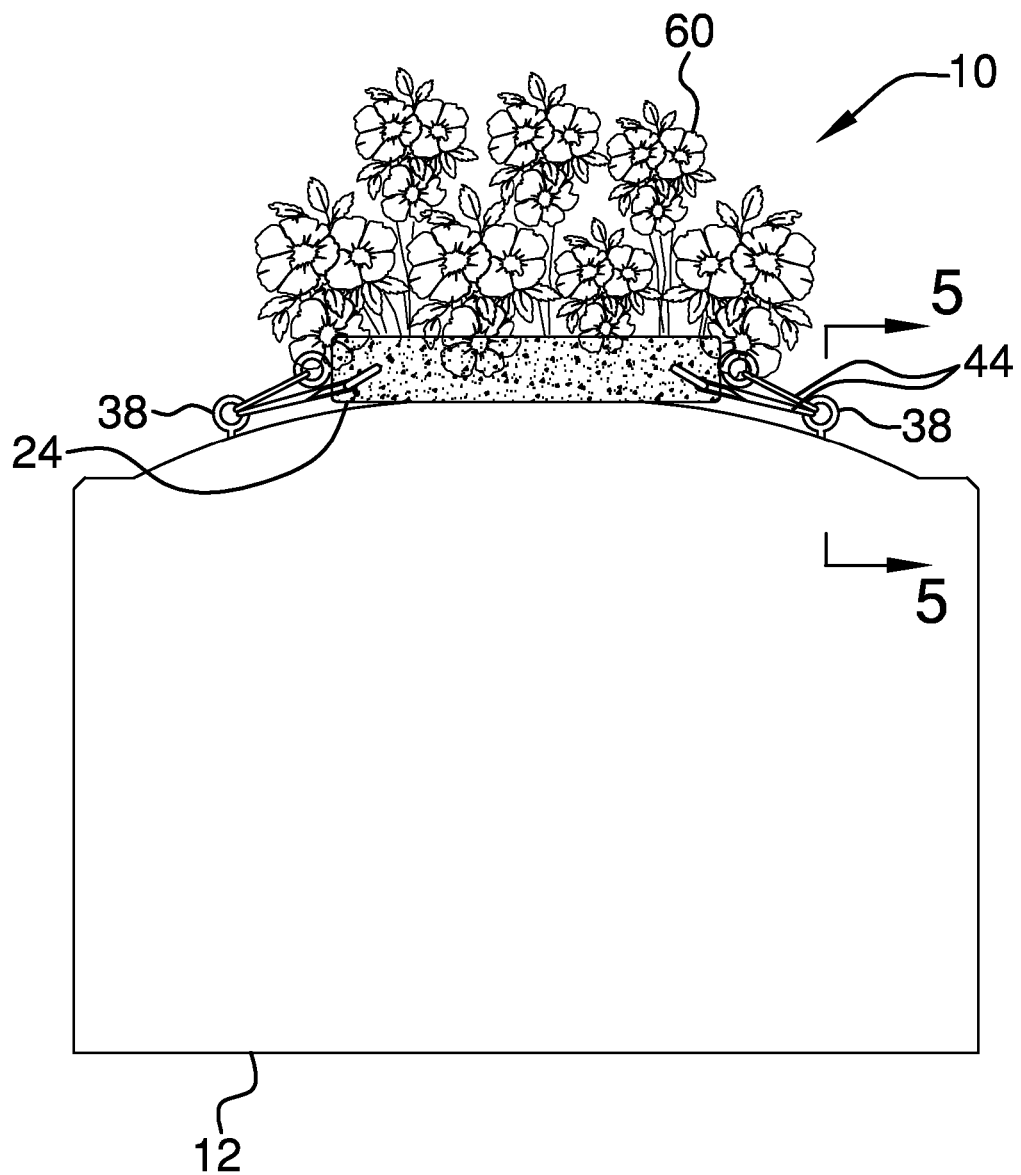
FIG. 1 is a front in-use view of a headstone flower mounting system according to the present invention.
Figure 2:
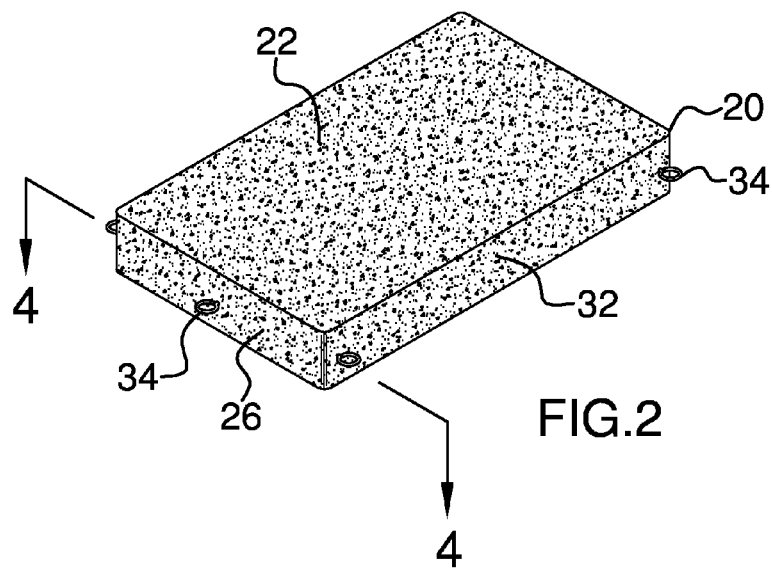
FIG. 2 is a perspective view of a block of the present invention.

With reference now to the drawings, and in particular to FIGS. 1 through 6 thereof, a new flower mounting device embodying the principles and concepts of the present invention and generally designated by the reference numeral 10 will be described.

As best illustrated in FIGS. 1 through 6, the headstone flower mounting system 10 generally comprises a headstone 12 that has an upper edge 14, a front side 16 and a back side 18. The headstone 12 may be made out of any conventional material including but not limited to granite, marble and the like.

A block 20 has a top side 22, a bottom side 24, a first end 26, a second end 28, a first lateral side 30, a second lateral side 32. The bottom side 24 of the block 20 abuts the upper edge 14 of the headstone 12. The block 20 is comprised of a material capable of receiving flower 60 stems. The material of the block 12 may include a foamed plastic material.

Figure 4:
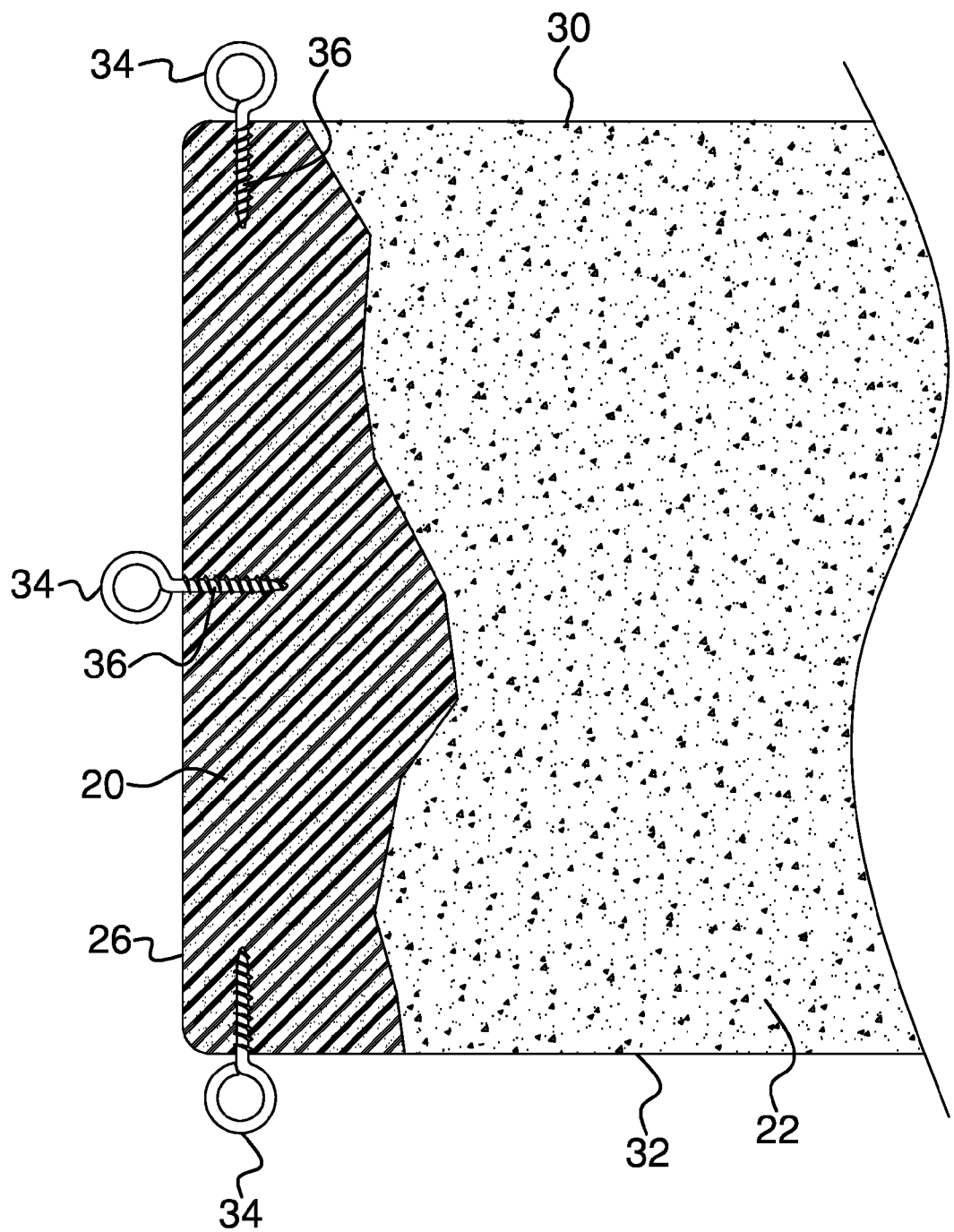
FIG. 4 is a broken view of the present invention taken along line 4-4 of FIG. 3.
Figure 5:
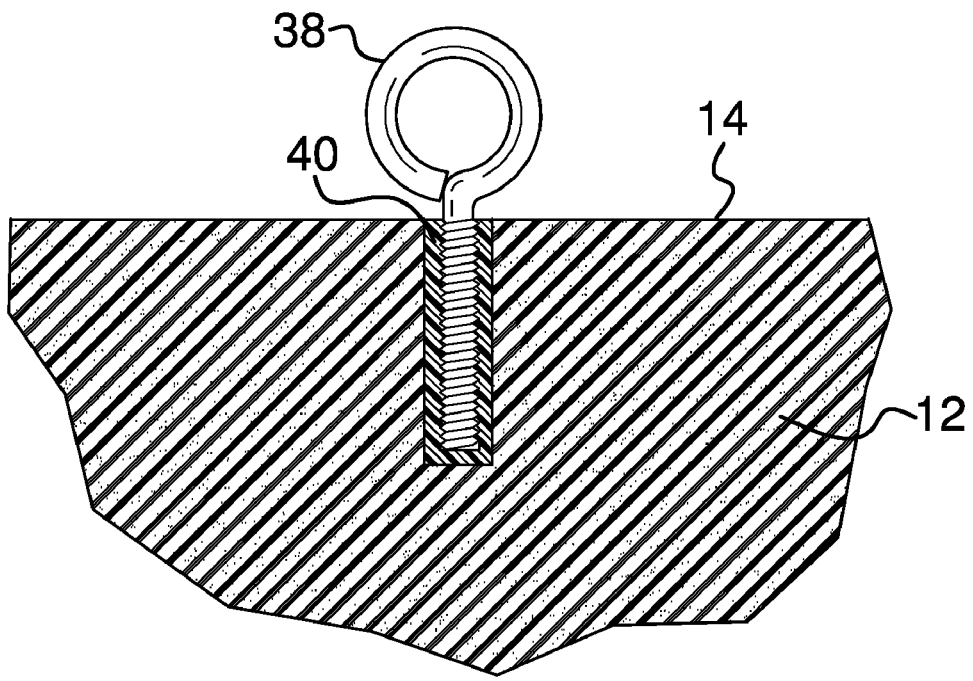
FIG. 5 is a cross-sectional view taken along line 5-5 of FIG. 1 of the present invention.
Figure 6:
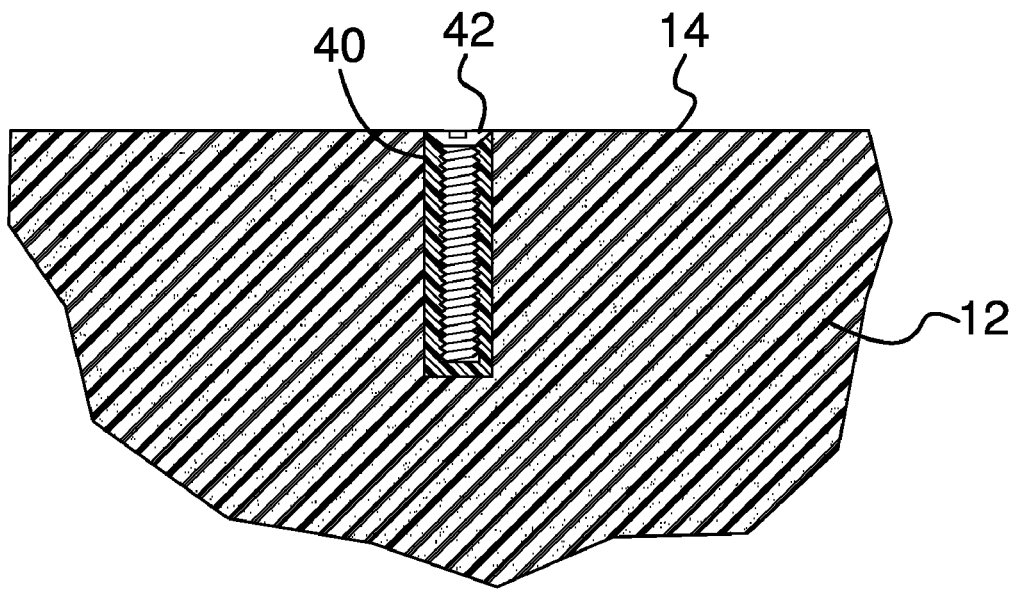
FIG. 6 is a cross-sectional view of the present invention showing a screw positioned in an insert.

A plurality of hook members 34 is extended into the block 20. Each of the first 26 and second 28 ends has one of the plurality of hook members 34 therein. The first 26 and second 28 lateral sides have two of the hook members 34 therein. One of each of the hook members 34 in the first 30 and second 32 lateral sides is positioned adjacent to the first end 26 and one of each of the hook members 34 in the first 30 and second 32 lateral sides is positioned adjacent to the second end 28. The hook members 34 may or may not include a closed loop structure. The hook members 34 each include a threaded rod 36 that is extendable into and threadably coupled to the block member 20 as shown in FIG. 4.

A pair of eyebolts 38 is provided. Each of the eyebolts 38 extends into the upper edge 14 of the headstone 12. The block 20 is positioned between the eyebolts 38 and each of the eyebolts 38 is positioned adjacent to one of the first 26 and second 28 ends. The eyebolts 38 may be extended into and directly coupled to the headstone 12. However, a pair of inserts 40 may also be provided which are extended into the upper edge 14 of the headstone 12. Each of the inserts 38 threadably receives one of the eyebolts 38. When the eyebolts 38 are not in the inserts 40, a flathead screw 42 may be positioned in the inserts 40 so that they are flush with the top edge 14. If a user of the headstone 12 wants to attach the block 20, the flathead screws 42 are removed and replaced with the eyebolts 38. This allows holes to be drilled into the headstone 12 and plugged with the screws 42 during the fabrication of the headstone 12.

Figure 3:
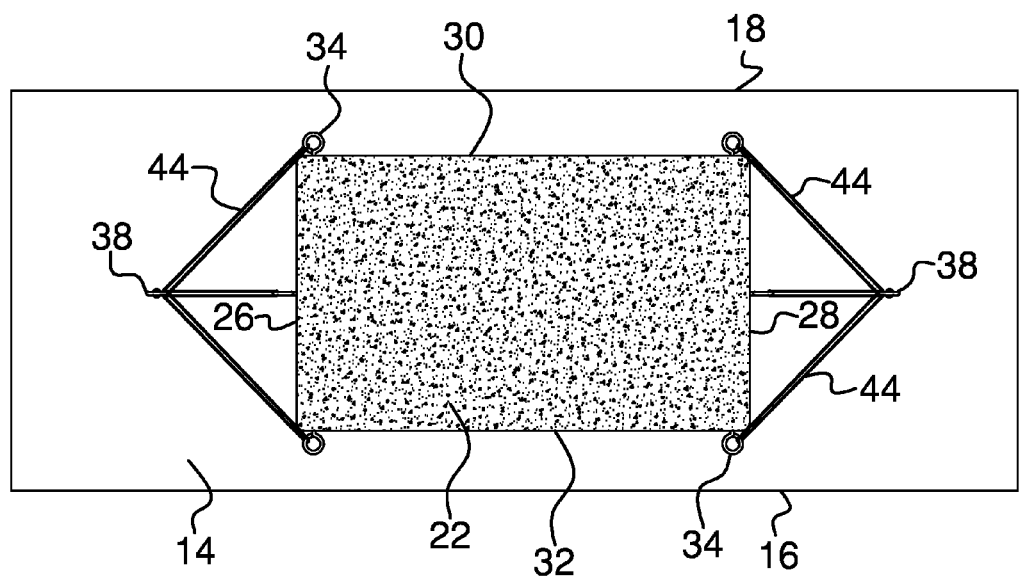
FIG. 3 is a top view of the present invention.

A plurality of bands 44 is provided. Each of the bands 44 is attached to and extends between one of the eyebolts 38 and one of the hook members 34 so that each of the hook members 34 has one of the bands 44 attached thereto. In particular, each of the eyebolts 38 has three bands 44 attached thereto as shown in FIG. 3.

In use, the block 20 is attached to the headstone 12 as described above and shown in the Figures. Once the block 20 is secured to the headstone 12, a plurality of flowers 60 may be extended into the top side 22 of the block 20.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A flower mounting assembly comprising in combination:
   a headstone having an upper edge, a front side and a back side;
   a block having a top side, a bottom side, a first end, a second end, a first lateral side, a second lateral side, said bottom side of said block abutting said upper edge of said headstone, said block being comprised of a material capable of receiving flower stems;
   a plurality of hook members being extended into said block, each of said first and second ends having one of said plurality of hook members therein, each of said first and second lateral sides having two of said hook members therein, one of each of said hook members in said first and second lateral sides being positioned adjacent to said first end, one of each of said hook members in said first and second lateral sides being positioned adjacent to said second end;
   a pair of eyebolts, each of said eyebolts extending into said upper edge of said headstone, said block being positioned between said eyebolts and each of said eyebolts being positioned adjacent to one of said first and second ends;
   a pair of inserts, each of said inserts extending into said upper edge, each of said inserts threadably receiving one of said eyebolts;
   a plurality of bands, each of said bands being attached to and extending between one of said eyebolts and one of said hook members; and
   wherein a plurality of flowers may be extended into said top side of said block.

2. A flower mounting assembly comprising in combination:
   a headstone having an upper edge, a front side and a back side;
   a block having a top side, a bottom side, a first end, a second end, a first lateral side, a second lateral side, said bottom side of said block abutting said upper edge of said headstone, said block being comprised of a material capable of receiving flower stems;
   a plurality of hook members being extended into said block, each of said first and second lateral sides having two of said hook members therein, one of each of said hook members in said first and second lateral sides being positioned adjacent to said first end and another of each of said hook members in said first and second lateral sides being positioned adjacent to said second end;
   a pair of eyebolts, each of said eyebolts extending into said upper edge of said headstone;
   a plurality of bands, each of said bands being attached to and extending between one of said eyebolts and one of said hook members; and
   wherein a plurality of flowers may be extended into said top side of said block.

3. The assembly of claim 2, wherein each of said first and second ends of said block has one of said plurality of hook members therein.

4. The assembly of claim 2, wherein said block is positioned between said eyebolts and each of said eyebolts is positioned adjacent to one of said first and second ends.

5. The assembly of claim 2, further including a pair of inserts, each of said inserts extending into said upper edge of said headstone, each of said inserts threadably receiving one of said eyebolts.

* * * * *